(12) United States Patent
Means (10) Patent No.: US 7,159,818 B2
(45) Date of Patent: Jan. 9, 2007

(54) MULTI-SPECTRAL AIR INLET SHIELD AND ASSOCIATED INLET STRUCTURE

(75) Inventor: James L. Means, The Villages, FL (US)

(73) Assignee: Northrop Grumman Ship Systems, Inc., Pascagoula, MI (US)

( * ) Notice: Subject to any disclaimer, the term of this patent is extended or adjusted under 35 U.S.C. 154(b) by 53 days.

(21) Appl. No.: 10/958,481

(22) Filed: Oct. 5, 2004

(65) Prior Publication Data

US 2006/0071126 A1    Apr. 6, 2006

(51) Int. Cl.
    *B64D 33/02*    (2006.01)
(52) U.S. Cl. .............. 244/53 B; 137/15.1; 454/71; 181/229; 55/505
(58) Field of Classification Search .......... 244/53 B, 244/121; 137/15.1, 15.2; 454/71, 76, 107–109, 454/10, 143, 146, 262; 181/229; 55/505
    See application file for complete search history.

(56) References Cited

U.S. PATENT DOCUMENTS

| | | | | |
|---|---|---|---|---|
| 2,398,322 A | * | 4/1946 | Neumann | 181/229 |
| 2,766,677 A | * | 10/1956 | Silverman | 454/8 |
| 2,942,683 A | * | 6/1960 | Moyer | 181/229 |
| 3,120,876 A | * | 2/1964 | Lirette | 181/229 |
| 3,477,358 A | * | 11/1969 | Howard | 454/10 |
| 3,509,568 A | * | 4/1970 | Manning et al. | 342/2 |
| 5,728,979 A | * | 3/1998 | Yazici et al. | 181/224 |
| 6,634,597 B1 | * | 10/2003 | Johnson et al. | 244/118.5 |
| 6,923,107 B1 | * | 8/2005 | Zurek et al. | 89/36.08 |

* cited by examiner

*Primary Examiner*—Galen Barefoot
(74) *Attorney, Agent, or Firm*—Alston & Bird LLP (57) ABSTRACT

A multi-spectral shield and associated inlet structure is provided for reducing the signature of an air inlet port defined within an exterior wall of an aircraft, ship, or land-based vehicle across radar and infrared wavelengths. The multi-spectral inlet shield includes a plate disposed in front of the air inlet port. The plate is sized to visibly eclipse the air inlet port, when viewed from a direction perpendicular to the plate. The plate is supported in this position by a plate mount or splitter that extends from within the air inlet port and attaches to the plate. A support may optionally combine with the splitter to support the plate in this position. Air passes behind the plate and into the air inlet port via a channel defined around at least a portion of the plate.

29 Claims, 7 Drawing Sheets

MULTI-SPECTRAL AIR INLET SHIELD AND ASSOCIATED INLET STRUCTURE

FIELD OF THE INVENTION

The present invention relates generally to reducing the radar and infrared detection of vehicles, and more particularly, to a multi-spectral air inlet shield and associated inlet structure for providing low radar and infrared signatures.

BACKGROUND OF THE INVENTION

The survivability of ships, modern military aircraft and other air vehicles such as missiles and satellites, and land-based vehicles may be traced, at least partially, to the relative observability of the vehicle to enemy detection systems. Principally, enemy detection systems rely on reflected radar waves and emitted infrared radiation to acquire and target military vehicles. Stealth technology and other methodologies were developed to defeat this acquisition and targeting capability by reducing a vehicle's overall radar cross section and infrared emissions. In response, counter-stealth technology was developed which yielded more precise detection systems that could isolate specific vehicle components that dominated an otherwise benign radar cross section. Accordingly, vehicles could be identified and targeted based on the signature produced by a few highly observable components, despite a relatively reduced radar and infrared cross section.

Aircraft, ship, and land-based vehicle propulsion systems project a unique, highly observable and often-targeted component signature. Perhaps the most observable element of many propulsion systems is the air inlet ports necessary to provide these systems sufficient quantities of air. Air is used by propulsion systems generally for combustion or cooling. The air supplied by inlet ports may also be used to sustain onboard systems such as Heating Ventilation and Air Conditioning ("HVAC") systems and the like.

Air inlet ports generally include a cavity that extends inwardly into the exterior surface of a vehicle to define a channel or duct for delivering air to the onboard systems referenced above. Impinging radar signals reflect off of the basic cavity/duct geometry of conventional air inlet ports to produce a distinctive radar reflection pattern, or signature, that can be identified and possibly targeted by enemy detection systems.

Apart from providing a window to wave reflecting surfaces or cavities, air inlet ports also provide a source of emitted infrared radiation which also may be used to identify and subsequently target a vehicle. Infrared radiation extends out from a heated or cooled source in a generally spherical or lambertian fashion. Moreover, enemy detection systems rely, at least in part, on their ability to locate areas of infrared radiation contrast (i.e., areas which are warmer or cooler than surrounding areas) when acquiring a target. Accordingly, air inlet ports are preferably designed to prevent line-of-sight interrogation of hot internal components or the relatively cooler surrounding condensation surfaces which could provide a distinctive infrared contrast area for acquisition by enemy detection systems.

Conventionally, louvers and/or screens have been provided within the openings defined by air inlet ports in order to reduce a port's radar and infrared signature while also preventing the ingestion of foreign matter. As detection systems have become more precise, it has become evident that louvers and/or screens present several problems. For example, to be effective in a low signature environment, both louvers and screens should be treated with radar suppressing materials. For louvers and especially screens, such treatments must be relatively thin to prevent blockage of the air inlet port. Unfortunately, in many cases the design of the louver and screen requires a radar coating so thin that its overall effectiveness is limited. This is especially true for impinging radar waves having relatively low frequencies on the order of 2 GHz.

Another problem associated with louvers and screens is the fact that each is supported within the air inlet port by a frame member. The border defined by the intersection of the louver/screen and the frame member forms a potential scatter center for radar waves. Accordingly, significant attention and expense must be allocated to ensure that such borders do not produce highly observable dihedral and trihedral structures as known to one of ordinary skill in the art.

Finally, screens in particular present a significant problem. Air inlet screens must be sized such that no radar energy can penetrate their mesh. This results in a reflective surface for radar energy and further generates surface noise due to the wire geometry. In addition, this mesh configuration makes it difficult to provide adequate infrared signature treatment and reduces the air flow efficiency of the inlet port.

Accordingly, it is desirable then to produce an improved apparatus for disguising an air inlet port from radar and infrared detection. Further, it is desirable to produce an improved apparatus which is capable of receiving an effective surface coating of radar and infrared radiation suppressing materials without significantly limiting the effectiveness of the air inlet port.

SUMMARY OF THE INVENTION

The present invention provides a multi-spectral air inlet shield and associated inlet structure for reducing the relative radar and infrared observability of commercial or private ships, naval vessels, or other air-breathing applications such as land-based vehicles, missiles and/or satellites. Specifically, the improved shield reduces the signature projected by air inlet ports across multiple spectrums including radar and infrared wavelengths. Air inlet ports, as described herein, refer to those ports disposed within the exterior wall of the above referenced vehicles that deliver air to various onboard systems. These systems may include, various gasoline, diesel or nuclear propulsion systems, HVAC systems, or other similar systems.

According to several embodiments of the present invention, the multi-spectral shield includes a plate disposed in front of the above described air inlet port. The plate is sized to visibly eclipse the air inlet port, when viewed from a direction perpendicular to the plate. For the purposes of this application, this direction will generally be referred to as a frontal direction. In one embodiment, the plate is supported in this position by a splitter that extends from within the air inlet port and attaches to the plate. In another embodiment, at least one support may combine with the splitter to support the plate. According to this embodiment, the support extends from the plate and attaches to the exterior wall of the vehicle. Alternatively, in another embodiment, the full weight of the plate may be supported by at least one support. According to this embodiment, the splitter is held cantilevered within the inlet port by the plate/support structure. In other embodiments, an improved inlet structure is provided which includes the multi-spectral shield in combination with the inlet port, the exterior wall, and optionally the splitter and/or at least one support.

The splitter and/or at least one support secures the plate a distance in front of the air inlet port so as to form a channel around at least a portion of the plate. The desired air stream then passes behind the plate and into the air inlet port. By shielding the air inlet port with the plate as discussed above, air may be provided to appropriate onboard systems while eliminating line-of-sight interrogation of the inlet ports by enemy radar and infrared detection systems.

According to one embodiment of the present invention, radar-suppressing materials cover at least one visible surface of the plate, the splitter, the air inlet port or the at least one support so as to limit the reflected radar energy. Traditional radar suppressing materials include coatings produced from dielectric materials, which contain ferromagnetic particles or other energy absorbing materials. Such materials are configured to slow the impinging radar waves down such that the ferromagnetic particles absorb the energy. Other similar materials or techniques may be used for suppressing radar return signals as commonly known to one of ordinary skill in the art. For example, according to one embodiment, at least one visible surface of the plate, the splitter, the air inlet port or the at least one support may be coated with a plurality of angular ridges or detents that serve to scatter impinging radar as known to one of ordinary skill in the art.

According to another embodiment, the structural geometry of at least one or all of the plate, the splitter, the air inlet port, and the at least one support may be shaped to scatter impinging radar signals, such that the return signal is re-directed away from its receiver. Said differently, the surfaces may be configured so that impinging radar waves strike the surfaces at close to tangential angles. Surfaces having such structures may be provided in addition to, or instead of, the radar-suppressing coatings described above.

According to another embodiment, the multi-spectral shield may include infrared suppression materials forming at least one visible surface of the plate, the splitter, or at least one support. Such materials further reduce the inlet port's observability by absorbing infrared radiation generally emitted by the hot internal components found within many air inlet ports. Such materials are used to reduce the observability of areas of high temperature contrast that are commonly targeted by enemy detection systems. In addition, at least one of the air inlet port, the at least one support, the splitter, and the plate may be physically structured to reduce specular infrared reflections produced by internal heatable components.

In another embodiment, the multi-spectral shield may include at least one aero-dynamically streamlined plate, splitter, or support in order to produce a relatively silent and efficient air flow into the air inlet port, as known to one of ordinary skill in the art. In another embodiment, the channel provided around at least a portion of the plate is sized to minimize the radar cross-section produced by the shield while maintaining an acceptable pressure drop for air passing into the channel.

In another embodiment, the air inlet port may be disposed within a recessed portion of an exterior wall. According to this embodiment the exterior surface of the plate is positioned substantially planar to the non-recessed portion of the exterior wall, thereby preventing significant alteration of the lateral radar cross section of the vehicle.

According to another embodiment, the air inlet port may be disposed within a recessed portion proximate a corner of an exterior wall. As with the above-described embodiment, in this embodiment the exterior surface of the plate is positioned substantially planar to the non-recessed portion of the exterior wall, thereby preventing any significant alteration of the lateral radar cross section of the vehicle.

In another embodiment, the air inlet port may be an air inlet port positioned aboard a ship, wherein the air inlet port is of sufficient size to deliver air to the power plant of a ship. Specifically, the air inlet port may be sized to extend over at least two vessel decks. According to this embodiment, the at least one support discussed above may extend from, or be unitary with, the at least two vessel decks to thereby support the plate in front of the air inlet port.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions will be described more fully hereinafter with reference to the accompanying drawings, in which some, but not all embodiments in the invention, are shown. Indeed, these inventions may be embodied in many different forms and should not be construed as limited to the embodiments set forth herein; rather, these embodiments are provided so that the disclosure will satisfy applicable legal requirements. Like numbers refer to like elements throughout.

Figure 1:
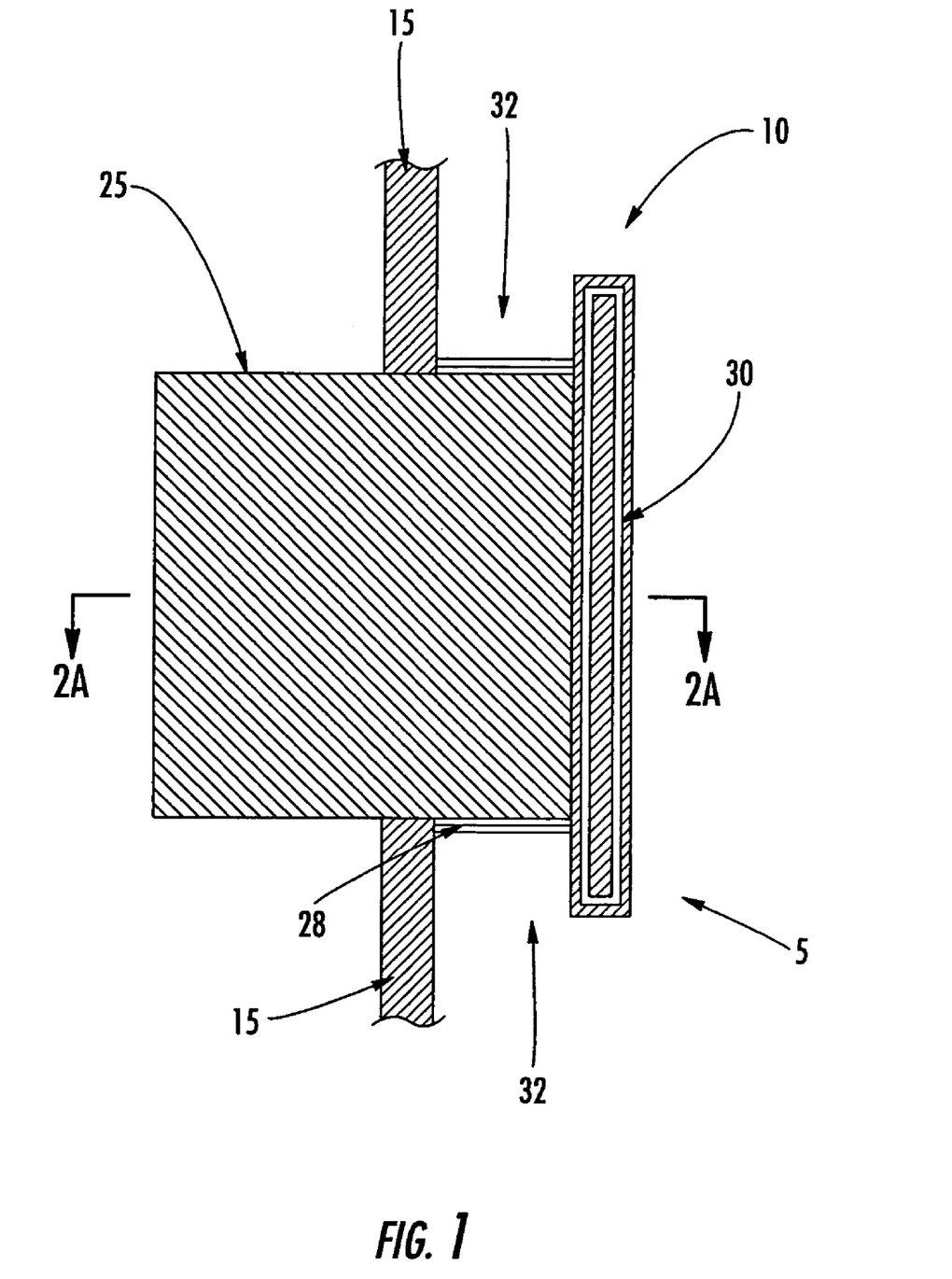
FIG. 1 is a side view of a multi-spectral shield in accordance with one embodiment of the present invention.
Figure 2A:
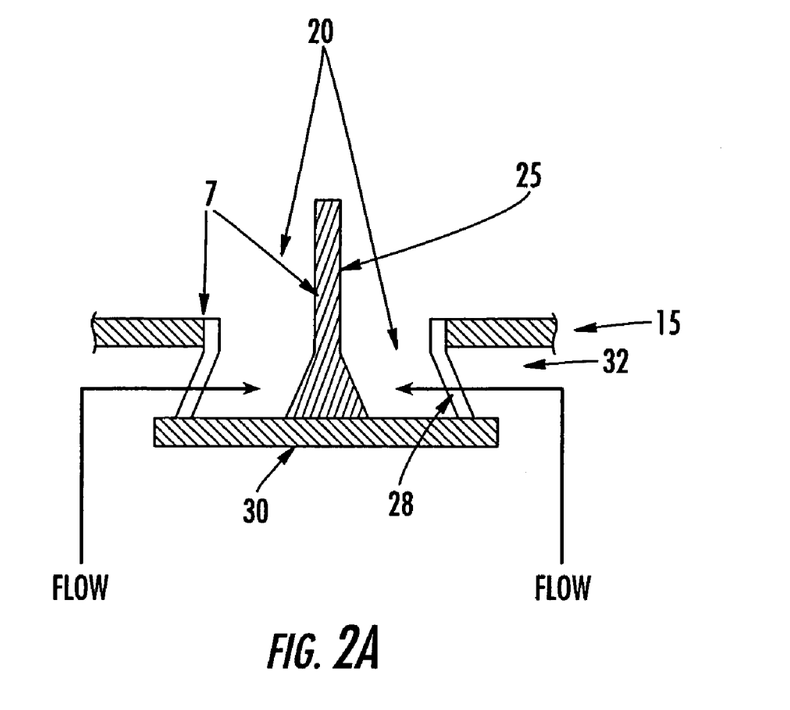
FIG. 2A is a top view of the multi-spectral shield of FIG. 1, taken along section line 2A—2A.
Figure 2B:
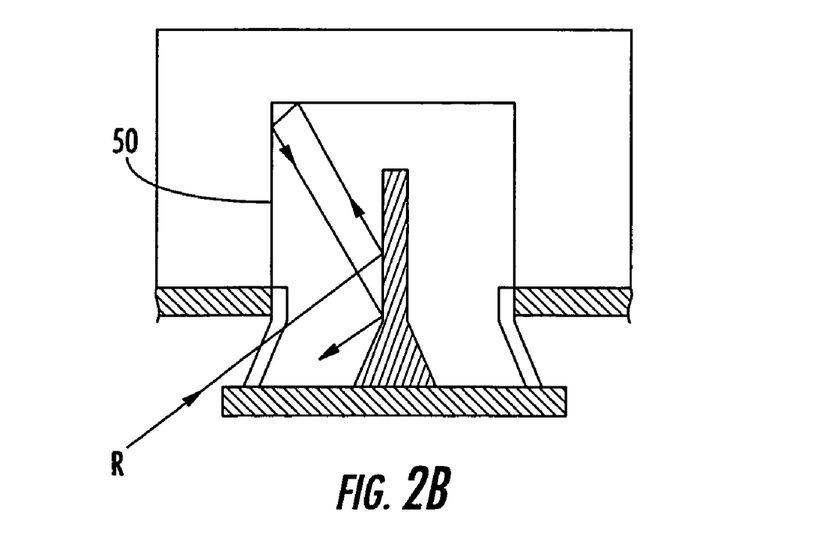
FIG. 2B is a top view of the multi-spectral shield of FIG. 1, specifically illustrating one possible reflection path for impinging radar or infrared energy.

Referring to FIGS. 1 and 2, there is illustrated the side and top views of a multi-spectral inlet shield 10 in accordance with one embodiment of the present invention. According to the depicted embodiment, the multi-spectral shield 10 includes a plate 30 positioned in front of an air inlet port 20 of a vehicle (e.g., a commercial or private ship, a naval vessel, a land-based vehicle, aircraft, missile, satellite, and the like). A splitter 25 extends from within the air inlet port 20 and attaches to the plate 30 as shown. In one embodiment, the splitter 25 can remain cantilevered within the inlet port 20 as shown, or in other embodiments may attach to an interior structural member of the vehicle (e.g., interior wall of the inlet port, interior frame, flange, or other component as will be apparent to one of skill in the art)(not shown). In embodiments where the splitter 25 is cantilevered, the weight of the plate 30 (and splitter) is supported by at least one support 28. In various embodiments, the support 28 may be a bracket (as shown), frame or other mechanical structure known in the art. In embodiments where the splitter 25 is attached to one or more internal components, the weight of the plate 30 is carried at least partially by the splitter 25. Attachment of the splitter 25 to the plate 30 is accomplished using any desired form of structural joining or bonding as known to one of ordinary skill in the art. In one embodiment, the splitter 25 is manufactured as an integral part on the inner surface of the plate 30.

In various embodiments, the splitter 25, the plate 30, and the channel-type geometry of the air inlet port 20 combine to reduce the radar and infrared signature produced by the air inlet port 20 of a target vehicle. With regard to the inlet port's radar signature, the splitter 25, plate 30 and channel-type geometry of the air inlet port 20 are structured to reduce the number, magnitude and frequency of radar signals returning to interrogating enemy detection systems. In one embodiment, radar signal return is suppressed by providing the splitter 25, which blocks the interior cavity of the air inlet port 20 from view over all principle interrogation angles. As illustrated in FIG. 2B, this configuration causes impinging radar waves, as illustrated by Arrow R, to repeatedly reflect between the splitter 25 and the inner wall 50 of the air inlet port 20 before returning in the direction of the radar receiver (not shown). In one embodiment, the splitter 25 and opposing interior walls 50 of the air inlet port 20 are coated with radar absorbing materials as discussed in detail below. Such radar absorbing materials may include dielectric materials or other similar materials as known in the art. Accordingly, radar signals emitted by enemy detection systems are partially absorbed and thereby weakened by each impact with the splitter 25 and inner walls 50.

In other embodiments, an air inlet port's infrared observability may be similarly reduced. In one embodiment, the splitter 25 and interior walls 50 of the inlet port 20 are coated with materials that absorb infrared radiation, such as infrared absorbing paints, inks or other similar known materials. Accordingly, infrared energy emitted by hot or cold internal vehicle surfaces is repeatedly deflected between the splitter 25 and interior walls 50, thereby reducing the likelihood of detection by thermal imaging systems. In various embodiments, the above described coated splitter/inner wall structure is configured such that enemy detection systems perceive the air inlet port 20 as having a temperature approximating that of the ambient air.

Although depicted in the attached figures as having a generally vertical orientation, splitters 25 according to various embodiments of the present invention may be aligned in any direction. The precise alignment or geometry of the splitter 25 may change depending on the application, based principally on the likely trajectory of the threat (e.g., the interrogating angle of an enemy detection system). For example, air inlet ports 20 designed to evade detection by overhead satellite imaging systems may require horizontally positioned splitters 25, while air inlet ports 20 designed to limit detection by radar or thermal imaging systems aboard an adjacent enemy ship may require a vertically aligned splitter 25 as shown in FIGS. 1 and 2.

For the purposes of this application, the splitter 25, the one or more supports 28, or any combination thereof may be collectively referred to as a plate mount 7. Further, the one or more supports 28 may be optionally omitted from various embodiments of the present invention as described below. The multi-spectral shield 10, the splitter 25, the air inlet port 20, the one or more exterior walls 15, and the optional one or more supports 28 are collectively referred to herein as an inlet structure 5.

According to the embodiment depicted in FIGS. 1 and 2A, air inlet ports 20 may be defined within any radar/IR exposed surface or exterior wall 15 of a ship, land-based vehicle, missile, satellite, etc. FIGS. 1 and 2A depict an air inlet port 20 defined within an exterior wall 15. In the depicted embodiment, the plate 30 is positioned in front of the air inlet port 20 and spaced from the exterior wall 15 such that a channel 32 is formed around at least a portion of the plate 30. Air passes through the channel 32 as illustrated by the FLOW arrows. The plate 30 is sized to visibly eclipse the air inlet port 20 and thereby disrupt line-of-sight interrogation of the air inlet port 20 by interrogating radar and infrared detection systems. In this regard, the plate 30 is sized to be larger than the inlet port 20. Although not necessary for the present invention, the plate 30 is typically centered relative to the inlet port 20, but, in any event is positioned relative to the port 20 so as to visibly eclipse the port 20, typically when viewed from the frontal direction. In various embodiments, the plate 30 may be parallel to the exterior wall 15 as shown, or in alternate embodiments, may be angled relative to exterior wall 15 as desired.

Figure 3A:
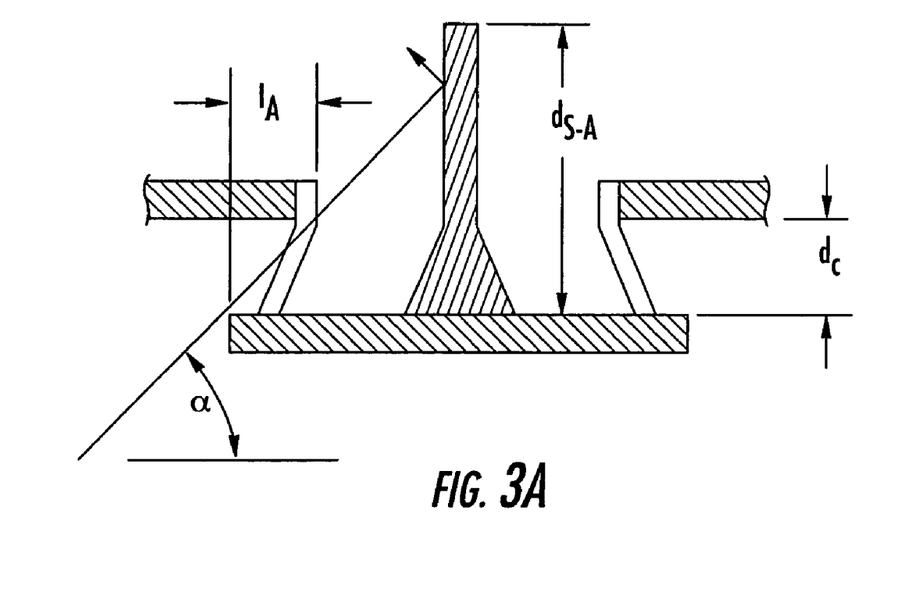
FIG. 3A is a top view of a multi-spectral shield according to the present invention further illustrating air inlet port geometry according to one embodiment.
Figure 3B:
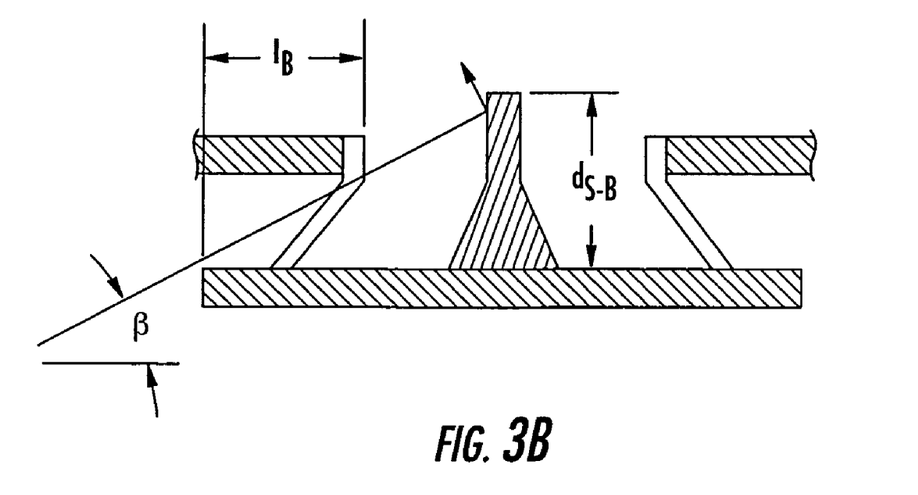
FIG. 3B is a top view of a multi-spectral shield according to the present invention further illustrating air inlet port geometry according to a second embodiment.

As illustrated in FIGS. 3A and 3B, the size of the plate 30 corresponds generally with the size of the air inlet port 20. FIG. 3A illustrates a first sized splitter and channel configuration while FIG. 3B illustrates a second sized splitter and channel configuration. Notably, the size of the air inlet port 20 and associated plate 30 may require tailoring to a particular application. For example, many conventional onboard propulsion or HVAC systems are passive and, thus, the size of the air inlet port 20 (and indirectly the size of the plate 30) is dictated by the quantity of air required to sustain the onboard system. Accordingly, "air hungry" systems may require large inlet ports while less-demanding systems may require smaller inlet ports. In various other embodiments, the flow requirements of air hungry systems may be supplemented by the use of booster fans (not shown) or other similar devices known in the art.

As will be apparent to one of ordinary skill in the art, the relative sizes of the plate 30, splitter 25, air inlet port 20, and channel 32 are generally related such that the desired radar and infrared reflectivity may be achieved. For example, the depth of the channel $d_c$ and the length of the plate-to-exterior wall overlap $l_A$ dictate the required splitter depth $d_{S-A}$. The splitter 25 must be long enough to ensure that impinging radar signals across all threat angles contact either the plate 30 or the splitter 25 before entering the air inlet port 20. Moreover, by increasing the plate-to-wall overlap from $l_A$ in FIG. 3A to $l_B$ in FIG. 3B, the maximum interrogation angle may be decreased from $\alpha$ in FIG. 3A to $\beta$ in FIG. 3B, thereby reducing the required splitter depth from $d_{S-A}$ to $d_{S-B}$ as shown. Alternatively, as apparent to one of ordinary skill in the art, similar results may be achieved by reducing the channel depth $d_c$. In various embodiments, the minimum channel depth $d_c$ may be limited to preclude undue restriction and ensure that a sufficient flow of air is provided to onboard systems.

As referenced above, radar-suppressing materials may form at least one visible surface of the plate 30, the air inlet port 20, the splitter 25, or the at least one support 28 so as to suppress radar signal return. Although not necessary for the present invention, typically all visible exterior surfaces of the air inlet port 20, the splitter 25, and the at least one support 28 are coated with radar-suppressing materials. In addition, in various embodiments, at least one or all of the plate 30, the splitter 25, the air inlet port 20, and the at least one support 28 may be shaped to scatter an impinging radar signal (not shown). Such techniques are commonly known in the art and function to re-direct impinging radar signals away from the radar receiver, thus, further suppressing radar signal return. Advantageously, according to the present invention, conventional louvers, screens and their associated frames may be omitted, thereby, reducing likely areas of specular reflection and diffraction return.

In addition to, or instead of the above radar suppressing techniques, other multi-spectral shield 10 embodiments may include infrared-suppression materials forming at least one visible surface of the plate 30, the splitter 25, the air inlet port 20 or the at least one support 28. Although not necessary for the present invention, typically each of the visible exterior surfaces of the air inlet port 20, the splitter 25, and the at least one support 28 are coated with infrared-suppression materials (e.g., infrared absorbing paints, inks and the like). Such materials further reduce the signature of the multi-spectral shield 10 by absorbing the infrared radiation produced by hot or cold internal surfaces found within air inlet ports 20. In various embodiments, these materials reduce the likelihood that enemy detection systems will be able to identify or target areas of high infrared radiation contrast located within the air inlet port 20. In another embodiment, at least one of the air inlet port 20, the at least one support 28, the splitter 25, and the plate 30 may be physically structured to reduce specular infrared reflections produced by internal heatable components via techniques known to one of ordinary skill in the art.

Figure 4:
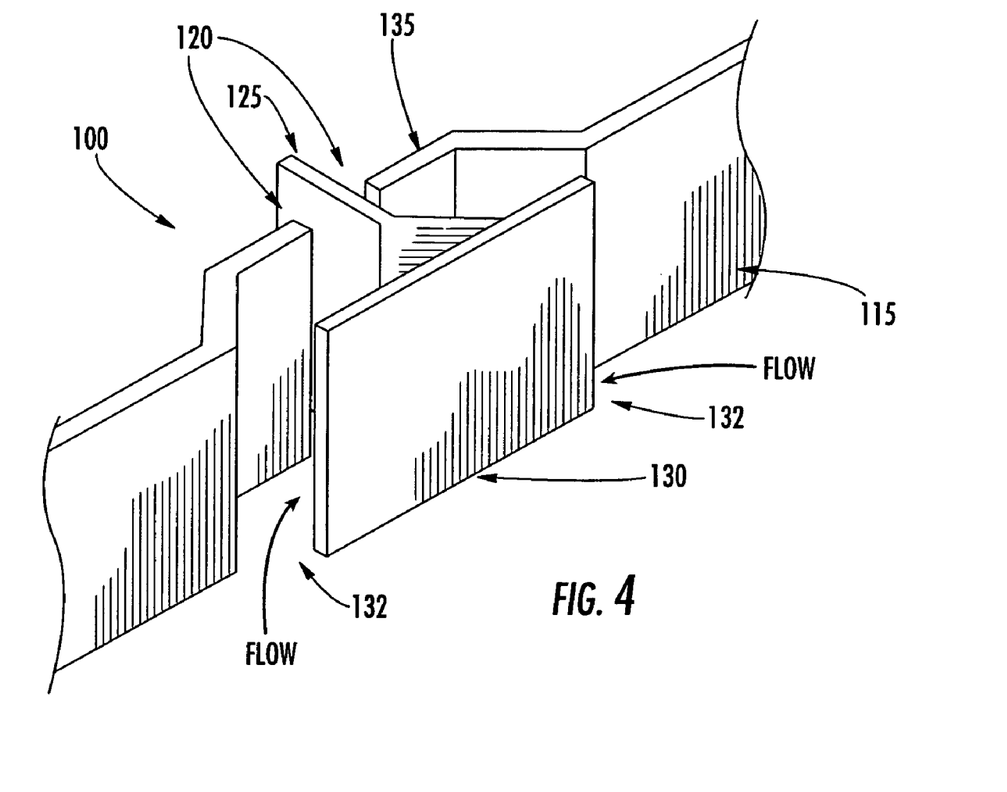
FIG. 4 is a perspective view of a multi-spectral shield in accordance with another embodiment of the present invention.

FIG. 4 illustrates another embodiment of the multi-spectral shield 100 in accordance with the present invention. According to the embodiment depicted in FIG. 4, the exterior wall 115 includes a recessed portion 135. Advantageously, the air inlet port 120 is provided within this recessed portion 135 as shown. Once again, a plate 130 is provided in front of the air inlet port 120, wherein the plate 130 is supported by a splitter 125 that extends from within the air inlet port 120. The plate 130 is sized to visibly eclipse the air inlet port 120 when viewed frontally. In addition, the plate 120 also eclipses at least a portion of the recessed portion 135 of the wall. As discussed above, sizing the plate 130 in this manner disrupts line-of-sight interrogation of the air inlet port 120 and the recessed portion 135 by radar and infrared detection systems. In other embodiments, the plate 130 may be further supported by at least one support (not shown).

Additionally, the plate 130 is supported a distance in front of the recessed portion 135 so as to create a channel 132 around at least a portion of the plate 130. Again, air passes behind the plate 130 and into the air inlet port 120 via the channel 132 as shown. In this embodiment, the plate 130 is positioned substantially planar to the non-recessed portion 115 of the wall as shown. This placement allows further reduction in the radar signature of the multi-spectral shield 100 by preventing a significant alteration of the lateral radar cross section of the vehicle. Although not shown, in other embodiments where a vehicle's lateral cross section is less critical, the plate 130 may be positioned substantially non-planar relative to the non-recessed portion 115 of the wall (i.e., fully within the recessed portion or positioned generally in front of the exterior wall of the vehicle).

Figure 5A:
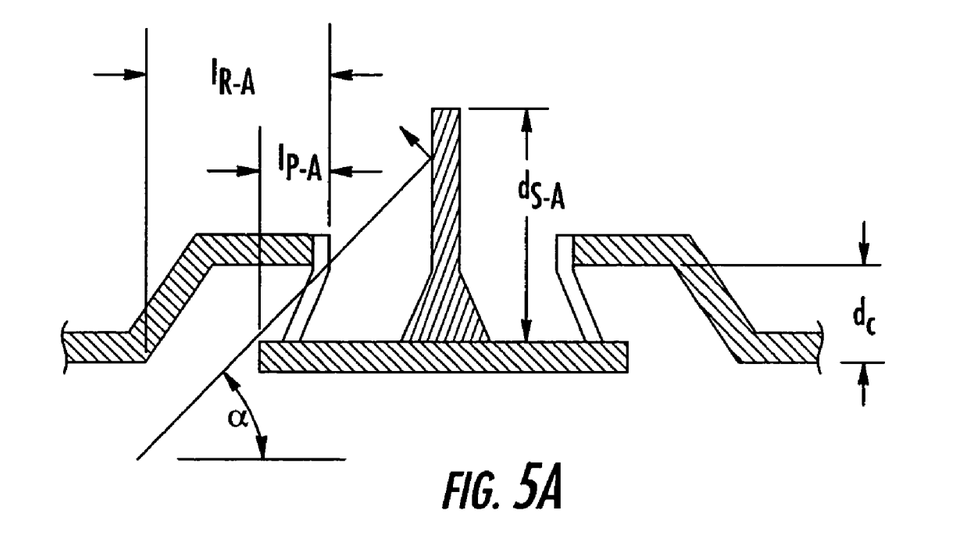
FIG. 5A is a top view of a recessed multi-spectral shield according to the present invention further illustrating air inlet port geometry according to one embodiment.
Figure 5B:
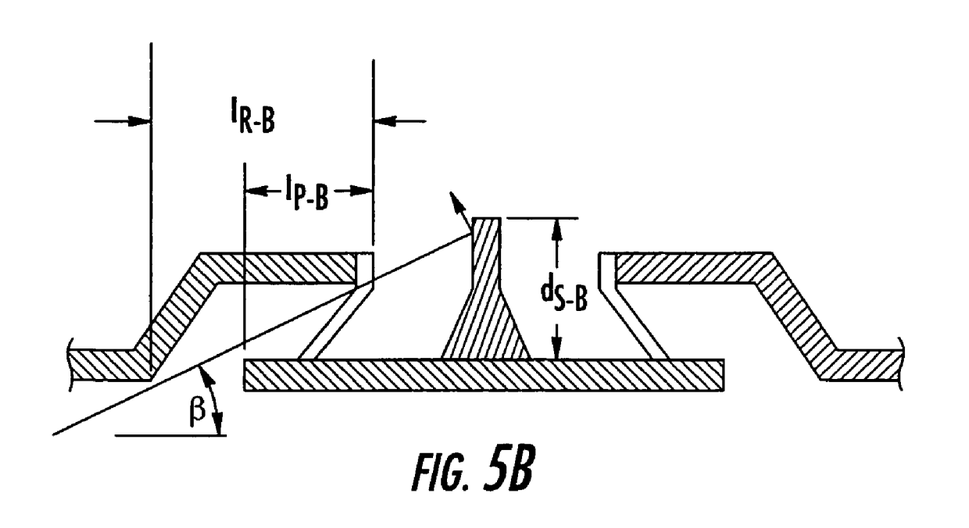
FIG. 5B is a top view of a recessed multi-spectral shield according to the present invention further illustrating air inlet port geometry according to a second embodiment.

As illustrated in FIGS. 5A and 5B, the plate 130 is sized to be generally larger than the air inlet port 120 and smaller than the recessed portion 135 of the wall. Notably, as with non-recessed embodiments, the size of the air inlet port 120, plate 130, and recessed portion 135 change depending upon the application. For example, many conventional onboard propulsion or HVAC systems are passive and, thus, the size of the air inlet port 120 (and indirectly the size of the plate 130) is dictated by the quantity of air required to sustain the system. Other characteristics may be altered depending on the application without detracting from the inventive concepts herein described. For example, as apparent to one of ordinary skill in the art, the depth of the channel $d_c$, the length of the plate-to-interior wall overlap $l_{P-A}$, and the length of the recessed portion $l_{R-A}$ dictate the required splitter depth $d_{S-A}$. Moreover, by increasing the plate-to-interior wall overlap from $l_{P-A}$ to $l_{P-B}$, and/or the length of the recessed portion from $l_{R-A}$ to $l_{R-B}$, the maximum interrogation angle may be decreased from α to β, thereby reducing the required splitter depth to $d_{S-B}$ as shown in FIG. 3B. Alternatively, similar results may be achieved by reducing the channel depth $d_c$. In various embodiments, the minimum channel depth $d_c$ and the minimum length of the recessed portion IR may be limited to prevent undue restriction and ensure that a sufficient flow of air is continuously provided to onboard systems.

Figure 6:
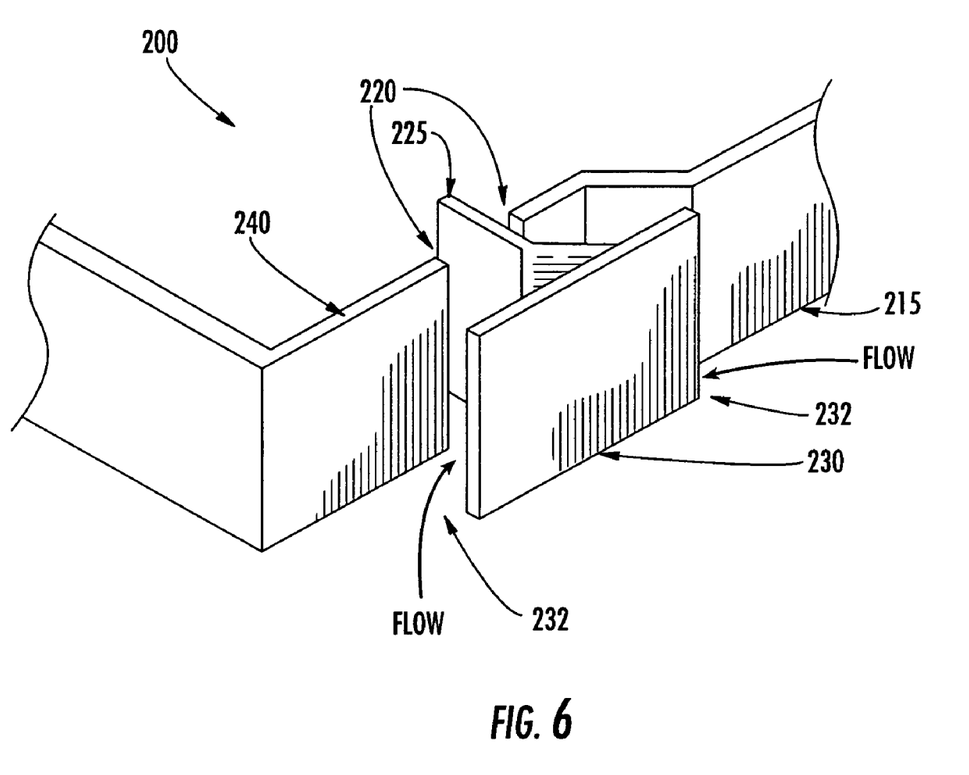
FIG. 6 is a perspective view of a multi-spectral shield disposed in a recessed corner portion of an exterior wall in accordance with another embodiment of the present invention.

FIG. 6 depicts another embodiment of a multi-spectral shield 200 in accordance with the present invention. According to this embodiment, the multi-spectral shield 200 once again includes a plate 230 secured in front of an air inlet port 220; however, the air inlet port 220 is disposed within a corner recessed portion 240 of a wall. A splitter 225 extends from within the air inlet port 220 and attaches to the plate 230. Once again, the plate 230 is sized to visibly eclipse the air inlet port 220 and at least a portion of the corner recessed portion 240. In addition, the plate 230 is also secured a distance in front of the corner recessed portion 240, thereby defining a channel 232 through which the air may be drawn into the air inlet port 220.

Figure 7:
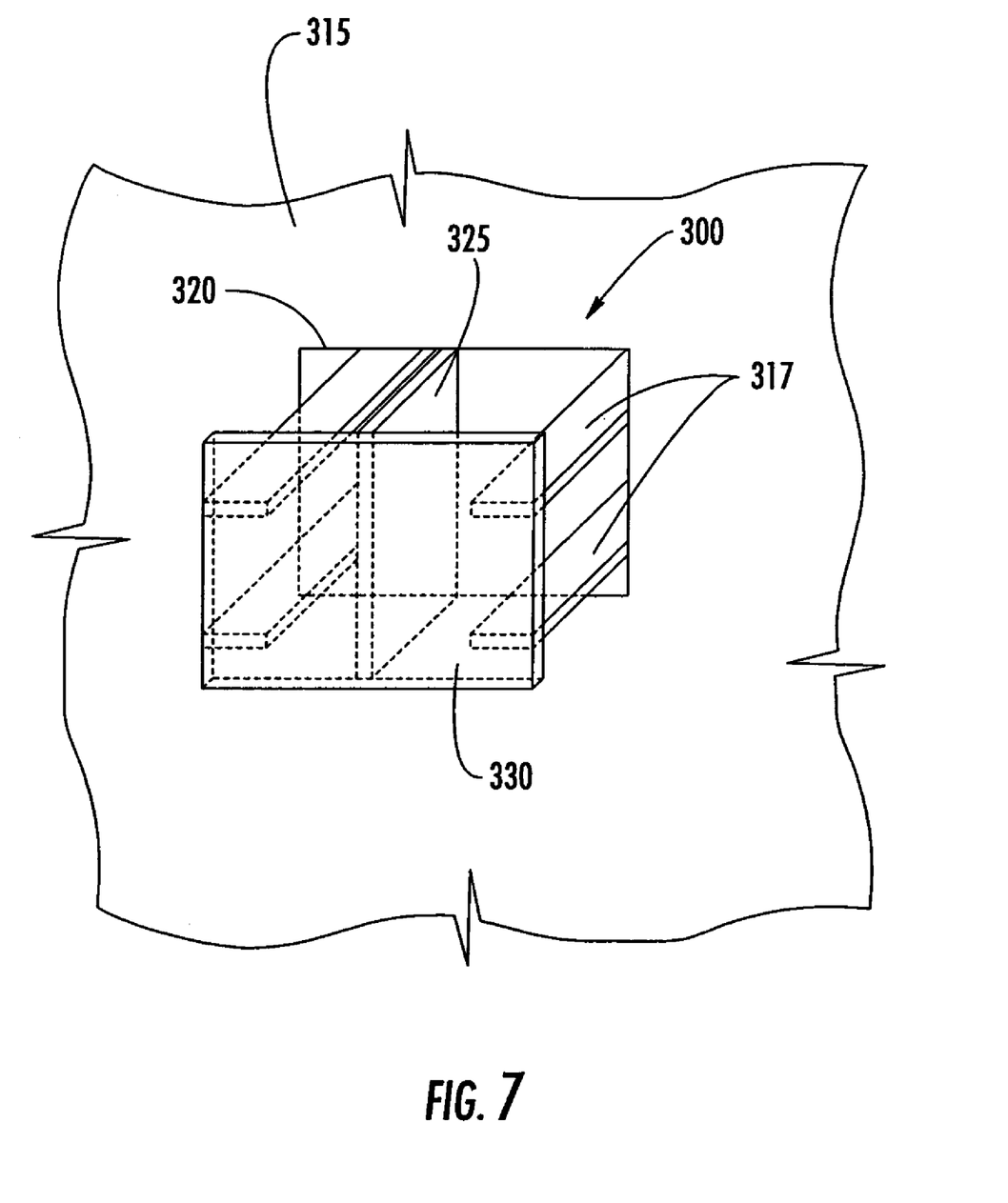
FIG. 7 is a perspective view of a multi-spectral shield disposed aboard a ship or naval vessel in accordance with one embodiment of the present invention.

FIG. 7 depicts yet another embodiment of the present invention. According to this embodiment, the multi-spectral shield 300 is positioned aboard a commercial, private or naval ship 305. According to this embodiment, the air inlet port 320 is positioned within an exterior surface 315 of the ship 305. In various embodiments, the air inlet port 320 may be of considerable size, and, thus, sufficient to deliver air to the ship's power plant (not shown). In one embodiment, the air inlet 320 is sized to extend over at least two ship decks 417. As with the previously described embodiments, a plate 330 is provided that visibly eclipses the air inlet port 320 when viewed from a direction perpendicular to the plate 330. A splitter 325 is also provided that extends from within the air inlet port 320 and attaches to the plate 330. According to the depicted embodiment, at least one support 328 extends from, or is unitary with, the at least two ship decks 317 to thereby support the plate 330 in front of the air inlet port 320.

EXAMPLE EMBODIMENT

In various embodiments, the present invention includes a multi-spectral shield wherein at least one of the plate, splitter, and/or the supports are appropriately sized and positioned relative to the air inlet port to ensure efficient operation of the vehicle's air breathing system (e.g., engine, HVAC system, etc.). In one example embodiment, a test air inlet structure was configured to feed a gas turbine engine (not shown). As will be apparent to one of skill in the art, gas turbine engines operate efficiently when fed by a uniform air flow having a total pressure drop of less than 4 inwg across the entire air inlet system. This total pressure drop includes any losses attributed to the inlet structure as well as any losses provided by ductwork or other internal obstructions. Accordingly, in various embodiments, the inlet structure components (i.e., the inlet port, the plate, the splitter, and the supports) must be configured such that the inlet structure does not unduly contribute to an unacceptable total pressure drop. In the test embodiment, it was determined that the pressure drop attributable to the inlet structure should not exceed 1 inwg. As will be apparent to one of ordinary skill in the art, other inlet structures having different flow characteristics or different air breathing systems may have vastly differing acceptable pressure drop values.

The test inlet structure was configured as follows. The air inlet port was shaped substantially as an isosceles trapezoid having dimensions of 32 inches×56 inches×44 inches (top of inlet×bottom of inlet×height). A similarly shaped plate was provided to cover the inlet having approximate overall dimensions of 35 inches×59 inches×47 inches. Accordingly, the plate was configured to visibly eclipse the air inlet port when viewed from the front. A splitter supported the plate in front of the inlet port, defining a channel depth of 13 inches. The splitter had approximate dimensions of 28 inches×44 inches (splitter depth×height). In this example embodiment, the splitter was vertically oriented and positioned to bisect the air inlet port. The splitter supported the plate substantially parallel to the exterior wall. The splitter was supported at its top and bottom sides by support brackets and the remaining length of the splitter (approximately 15 inches) was left cantilevered within the air inlet port as referenced above. The splitter was coated with an open cell reticulated foam for providing radar signal return suppression.

The above described test inlet structure produced a pressure drop of 0.2 inwg at an air flow of 13,608 cfm; 0.3 inwg at an air flow of 17,418 cfm; and 0.5 inwg at an air flow of 20,412 cfm. These results were deemed acceptable for disguising air inlet ports configured to feed gas turbine engines and compared favorably to the flow characteristics of a conventional louvered air inlet. If the results had proven unacceptable with regard to air flow, the plate size could be reduced, the channel size increased, and the component surfaces could be aerodynamically streamlined as will be apparent to one of ordinary skill in the art. The foregoing represents one example multi-spectral air inlet shield embodiment. The size, shape, and overall configuration of the multi-spectral shield embodiment outlined above was provided for illustration purposes only and should not be construed as limiting.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A shield for disguising an air inlet port, comprising:
   a plate disposed in front of said air inlet port, wherein said plate is sized to visibly eclipse said air inlet port, when viewed from a direction perpendicular to said plate; and
   a splitter extending from within said air inlet port for supporting said plate a distance from said air inlet port, thereby defining a channel around at least a portion of said plate through which air may pass into said air inlet port, said splitter defining a reflecting portion comprising a length, first and second reflecting surfaces extending from said plate, and a substantially non-uniform thickness defined between the first and second reflecting surfaces along at least a portion of the length of the reflecting portion, wherein at least one visible surface of said plate or said splitter is structured to suppress radar signal return or infrared radiation.

2. A shield as recited in claim 1, wherein said shield projects a radar cross section, and wherein said channel is sized to reduce said radar cross section, while maintaining a sufficient flow of air to at least one onboard system.

3. A shield as recited in claim 1, wherein said plate is structured to intercept radar signals originating from an expected threat direction.

4. A shield as recited in claim 1, wherein said air inlet port includes an inner wall and wherein said plate, said splitter and said channel are structured to intercept impinging radar signals prior to contacting said inner wall of said air inlet port.

5. A shield for disguising an air inlet port defined in an exterior surface of a vehicle, the shield comprising:
   a plate disposed in front of said air inlet port, wherein said plate is sized to visibly eclipse said air inlet port, when viewed from a direction perpendicular to said plate; and
   a splitter extending from within said air inlet port for supporting said plate a distance from the exterior surface of the vehicle, thereby defining a channel around at least a portion of said plate through which air may pass into said air inlet port, said splitter defining a reflecting portion comprising a length, first and second reflecting surfaces extending from said plate, and a substantially non-uniform thickness defined between the first and second reflecting surfaces along at least a portion of the length of the reflecting portion, and
   wherein at least one visible surface of said plate or said splitter is structured to suppress radar signal return.

6. A shield as recited in claim 5, wherein at least one visible surface of said plate or said splitter is structured to suppress infrared radiation.

7. A shield as recited in claim 5, wherein at least one of said plate, said splitter and said air inlet port are structured to absorb an impinging radar signal.

8. A shield as recited in claim 5, wherein at least one of said plate, said splitter and said air inlet port are structured to scatter an impinging radar signal.

9. A shield as recited in claim 5, wherein said air inlet port feeds at least one heatable onboard component, and wherein at least one of said air inlet port, said splitter and said plate are structured to reduce specular infrared reflections produced by said at least one heatable onboard component.

10. A shield as recited in claim 5, wherein said air inlet port is disposed in an exterior wall of a vehicle, and wherein said shield further comprises at least one support attached to said exterior wall for further supporting said plate a distance from said air inlet port.

11. A shield as recited in claim 10, wherein said vehicle is a ship and said air inlet port is sized to extend over at least two ship decks, and wherein said at least one support extends from the at least two ship decks to support said plate in front of said air inlet port.

12. An inlet structure, comprising:
an air inlet port;
a plate disposed in front of said air inlet port, wherein said plate is sized to visibly eclipse said air inlet port, when viewed from a direction perpendicular to said plate;
a plate mount for supporting said plate a distance from said air inlet port, thereby defining a channel around at least a portion of said plate through which air may pass into said air inlet port; and
a splitter extending into said air inlet port from said plate in a substantially cantilevered manner, wherein at least one visible surface of said plate, said plate mount, said splitter or said air inlet port is structured to suppress radar signal return or infrared radiation.

13. An inlet structure as recited in claim 12, wherein at least one of said plate, said plate mount, said splitter and said air inlet port are structured to absorb an impinging radar signal.

14. An inlet structure as recited in claim 12, wherein at least one of said plate, said plate mount, said splitter and said air inlet port are structured to scatter an impinging radar signal.

15. An inlet structure as recited in claim 12, wherein said plate projects a radar cross section, and wherein said channel is sized to reduce said radar cross section, while maintaining a sufficient flow of air to at least one onboard system.

16. An inlet structure as recited in claim 12, wherein said air inlet port feeds at least one heatable onboard component, and wherein at least one of said air inlet port, said plate mount, said splitter, and said plate are structured to reduce specular infrared reflections produced by said at least one heatable onboard component.

17. An inlet structure as recited in claim 12, wherein said plate is structured to intercept radar signals originating from an expected threat direction.

18. An inlet structure as recited in claim 12, wherein said air inlet port includes an inner wall and wherein said plate, said plate mount, said splitter, and said channel are structured to deflect an impinging radar signal prior to contacting said inner wall of said air inlet port.

19. An inlet structure as recited in claim 12, wherein said air inlet port is disposed in the exterior wall of a vehicle and wherein said plate mount comprises at least one support for attaching said exterior wall of said vehicle to said plate and supporting said plate a distance from said air inlet port.

20. An inlet structure as recited in claim 19, wherein said vehicle is a ship and said air inlet port is sized to extend over at least two ship decks, and wherein said at least one support extends from the at least two ship decks to support said plate in front of said air inlet port.

21. An inlet structure as recited in claim 12, wherein said splitter defines a reflecting portion comprising a length, first and second reflecting surfaces extending from said plate, and a substantially non-uniform thickness is defined between the first and second reflecting surfaces along at least a portion of the length of the reflecting portion.

22. A shield for disguising an air inlet port, comprising:
a plate disposed in front of an inlet port having an inner wall, wherein said plate is sized to visibly eclipse said air inlet port, when viewed from a direction perpendicular to said plate;
a plate mount for supporting said plate a distance from said air inlet port, thereby defining a channel around at least a portion of said plate through which air may pass into said air inlet port; and
a splitter attached to said plate and extending within said air inlet port in a substantially cantilevered manner, and wherein said plate, said splitter, and said channel are structured to deflect an impinging radar signal prior to contacting said inner wall of said air inlet port, and wherein at least one visible surface of said plate, said plate mount or said splitter is structured to suppress radar signal return.

23. A shield as recited in claim 22, wherein said shield projects a radar cross section, and wherein said channel is sized to reduce said radar cross section, while maintaining a sufficient flow of air to at least one onboard system.

24. A shield as recited in claim 22, wherein said air inlet port feeds at least one heatable onboard component, and wherein at least one of said air inlet port, said plate mount, said splitter and said plate are structured to reduce specular infrared reflections produced by said at least one heatable onboard component.

25. A shield as recited in claim 22, wherein said air inlet port is disposed in an exterior wall of a vehicle, and wherein said plate mount comprises at least one support that is attached to said exterior wall for further supporting said plate a distance from said air inlet port.

26. A shield as recited in claim 24, wherein said vehicle is a ship and said air inlet port is sized to extend over at least two ship decks, and wherein said at least one support extends from the at least two vessel decks to support said plate in front of said air inlet port.

27. A shield as recited in claim 22, wherein said splitter defines a reflecting portion comprising a length, first and second reflecting surfaces extending from said plate, and a substantially non-uniform thickness is defined between the first and second reflecting surfaces along at least a portion of the length of the reflecting portion.

28. An air inlet structure comprising:
an exterior wall defining a first vertical plane;
a recessed wall defining a second vertical plane positioned inwardly relative to the first vertical plane, said recessed wall comprising a first portion, a second portion, and an air inlet port defined therebetween, wherein the second portion of said recessed wall defines a recessed corner positioned substantially inwardly relative to the first vertical plane defined by said exterior wall;
a plate disposed in front of the air inlet port, wherein said plate is sized to visibly eclipse the air inlet port when viewed from a direction perpendicular to said plate, and wherein said plate is positioned a distance in front of the air inlet port to thereby define a channel around at least a portion of said plate through which air may pass into the air inlet port; and
a splitter extending from said plate at least partially into the air inlet port, wherein at least one visible surface of said plate or said splitter is structured to suppress radar signal return.

29. The vehicle of claim 28, wherein said splitter defines a reflecting portion comprising a length, first and second reflecting surfaces extending from said plate, and a substantially non-uniform thickness defined between the first and second reflecting surfaces along at least a portion of the length of the reflecting portion.

* * * * *